United States Patent
Kotani

(10) Patent No.: US 6,757,082 B2
(45) Date of Patent: Jun. 29, 2004

(54) IMAGE FORMING DEVICE

(75) Inventor: Masaki Kotani, Uji (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 645 days.

(21) Appl. No.: 09/749,002

(22) Filed: Dec. 27, 2000

(65) Prior Publication Data

US 2002/0051246 A1 May 2, 2002

(30) Foreign Application Priority Data

Dec. 28, 1999 (JP) .......................................... 11-375112

(51) Int. Cl.⁷ ................................................ H04N 1/04
(52) U.S. Cl. ....................... 358/486; 358/448; 358/1.12; 358/474; 358/468
(58) Field of Search ................................ 358/400, 401, 358/408, 474, 491, 296, 437, 468, 448, 1.12, 403, 404, 444, 476

(56) References Cited

U.S. PATENT DOCUMENTS

| | | | |
|---|---|---|---|
| 5,491,557 A | | 2/1996 | Nakajima et al. |
| 5,740,496 A | | 4/1998 | Kawabuchi et al. |
| 5,812,746 A | | 9/1998 | Mishima et al. |
| 5,901,276 A | * | 5/1999 | Murahashi et al. ........ 358/1.13 |
| 6,021,289 A | * | 2/2000 | Yamauchi .................... 399/87 |
| 6,064,490 A | * | 5/2000 | Minamizawa .............. 358/1.14 |

FOREIGN PATENT DOCUMENTS

| | | |
|---|---|---|
| DE | 4-302391 | 8/1993 |
| EP | 0-564871 | 10/1993 |
| JP | 06/245045 | 9/1994 |
| JP | 10-142846 | 5/1998 |

\* cited by examiner

*Primary Examiner*—Edward Coles
*Assistant Examiner*—Heather D Gibbs
(74) *Attorney, Agent, or Firm*—Hogan & Hartson, LLP

(57) ABSTRACT

A message is displayed on a display unit to indicate that copy reserve is ready even during copying operation. Even during copying, a document placed on a scanning unit (14) can be scanned after the number of copies and the scaling are set from a numerical key pad (16a) and a start key (16d) is pressed. The document is scanned in a scanning unit (14), the image data of which is stored in an image memory (18). As a result, even during copying operation, it is possible to reserve next copy.

6 Claims, 3 Drawing Sheets

FIG.3A

| COPY RESERVE READY | | | | | 17 |
|---|---|---|---|---|---|
| COPYING | 5/30 | | | | |
| COPY PROGRAM 1 | ORIGINAL 10 pcs | 8 SETS | PAPER SIZE A4 | SCALING 100% | |
| COPY PROGRAM 2 | ORIGINAL 18 pcs | 5 SETS | PAPER SIZE A4 | SCALING 81% | |
| ... | ... | ... | ... | ... | |

FIG.3B

| COPY RESERVE READY | | | | | | 17 |
|---|---|---|---|---|---|---|
| COPYING | 5/30 | | | | | |
| COPY PROGRAM 1 | ORIGINAL 10 pcs | 8 SETS | PAPER SIZE A4 | SCALING 100% | IN ABOUT 5 min | |
| COPY PROGRAM 2 | ORIGINAL 18 pcs | 5 SETS | PAPER SIZE A4 | SCALING 81% | IN ABOUT 12 min | |
| ... | ... | ... | ... | ... | ... | |

IMAGE FORMING DEVICE

CROSS REFERENCES TO RELATED APPLICATIONS

This application claims priority under 35 USC 119 of Japanese Patent Application No. 11-375112 filed on Dec. 28, 1999 in JPO, the entire disclosure of which is incorporated herein by reference.

BACKGROUND OF THE INVENTION

1. Field of the Invention

The present invention relates to an image forming device such as a copy machine or a facsimile machine with a copying function, and more particularly to an image forming device that is capable of scanning other documents of which copies are to be made while the machine is under copying operation.

2. Description of the Related Art

Image forming devices in the modern times are provided with an image memory so that scanned image of a document is stored in the image memory and later recorded on recording sheets by a recording unit (printer). As a result, it is possible to make a plurality of copies from each document even though the document including a plurality of pages is scanned only once.

However, no conventional device has been able to scan a document placed on a scanning section for the scanned image to be stored in an image memory while another scanned image is being recorded on recording sheets. In other words, while a device is copying, it has not been able to scan other documents for copying. In short, copy reservation has not been made possible.

SUMMARY OF THE INVENTION

It is thus an object of the present invention to provide an image forming device that enables a copy reservation.

According to a first aspect of the present invention, there is provided an image forming device including a scanning means for scanning first image, a memory means for storing the scanned first image, a recording means for recording the stored first image, and a control means for causing the scanning means to scan another image of which copy is to be made, and causing the memory means to store the scanned another image, while the recording means is recording the stored first image.

Copy conditions may be determined and said another image may be scanned while the recording means is recording the stored first image. The image forming device may further include a display means for displaying that the scanning of said another image is ready while the recording means is recording the first image. The display means may display contents of setting for copy of said another image. A user of the device can know that copy for said another image is set when the user sees such display. The display means may display waiting time until the completion of recording of the first image. With such display, the user can do an extra work until the completion of the recording of the first image. The contents of setting for copy may include the number of pages of a document to be scanned, the number of copies to be made, and the size of the recording sheet. The control means may not cause the scanning means to scan said another image if a remaining capacity of the memory means is less than a predetermined volume. Accordingly, the memory means will not overflow. The display means may display that the scanning of said another image is not possible if the remaining capacity of the memory means is less than the predetermined volume. The user will not perform an operation of copy of said another image if the user sees such display. The display means may display how many pages worth of image is scanned by the scanning means. The user can know whether all pages of the document are scanned by seeing such display.

In the following detailed description describing the embodiments of the present invention, the image forming device corresponds to a copy-facsimile machine 1 (hereinafter called copy-facsimile machine), the scanning means corresponds to a scanning unit 14, the memory means corresponds to an image memory 18, the control means corresponds to MPU 11, ROM 12 and RAM 13, the recording means corresponds to the recording unit 15, and the display means corresponds to a display unit 17.

BRIEF DESCRIPTION OF THE ACCOMPANYING DRAWINGS

FIG. 3A is an illustrative diagram to show the display unit employed in another embodiment.

FIG. 3B illustrates a display unit employed in still another embodiment.

DETAILED DESCRIPTION OF THE INVENTION

An image forming device embodied in a facsimile machine with a copying function will be described in detail with accompanying drawings as an embodiment of the present invention.

Figure 1:
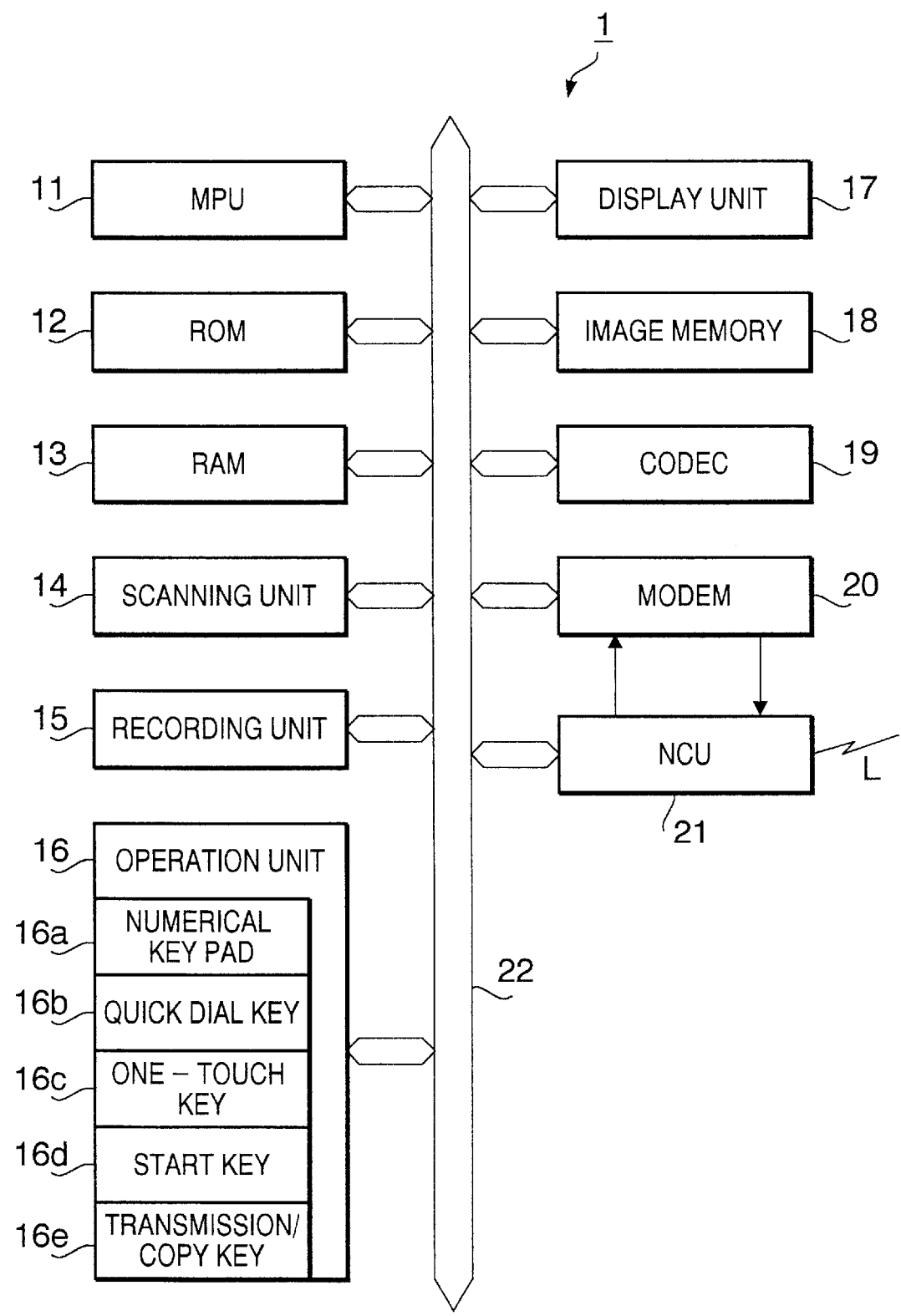
FIG. 1 is a block diagram to show the structure of a copy-facsimile machine.

As in FIG. 1, a copy-facsimile machine 1 includes MPU 11, ROM 12, RAM 13, a scanning unit 14, a recording unit 15, an operating unit (control panel) 16, a display unit 17, an image memory 18, CODEC 19, a modem 20 and NCU 21, and these hardware elements 11 to 21 are interconnected through a bus 22. The mode 20 and NCU 21 are directly connected to each other.

The MPU 11 controls each of the sections that compose the copy-facsimile machine 1. The ROM 12 stores programs used for controlling the copy-facsimile machine 1. The RAM 13 temporarily stores information related to the copy-facsimile machine 1.

The scanning unit 14 scans image data on a document and outputs black and white binary image data. The recording unit 15 includes an electro-photographic printer, and records image data received from remote sources as well as image data scanned by the scanning unit 14 from the document in the copying operation.

The operation unit 16 includes a series of operation keys such as a numeric key pad 16a (including the asterisk(*) and sharp(#) keys) for inputting telephone and facsimile numbers; a quick-dial key 16b for registering abbreviated numbers or sending messages using the abbreviated numbers; a one-touch key 16c that designates pre-installed FAX numbers with one push of the key; a start key 16d for starting the scanning; and a transmission and copy key 16e to switch between fax transmission and copying.

The display made up of an LCD or the like displays the state of operation and other information of the copy-facsimile machine 1.

The image memory 18 temporarily stores image data such as image data received from remote sources and image data scanned by the scanning unit 14. The CODEC 19 encodes the image data scanned by the scanning unit 14 in order to transmit it in an appropriate encoding method, such as MH, MR or MMR format. The CODEC 19 also decodes image data received from remote sources.

The modem 20 modulates and demodulates data that is sent or received according to V.17, V.27ter, V.29 or the like, based on ITU-T.30 recommendation in facsimile transmission procedures. The NCU 21 controls the establishment and breakage of connection with a telephone line L, and sends and receives dialing signals corresponding to receivers' fax numbers.

The operation of the copy-facsimile machine 1 in the copying mode will now be described according to the flow chart of FIG. 2. The operation is executed under the control of the MPU 11 based on the programs stored in the ROM 12.

Figure 2:
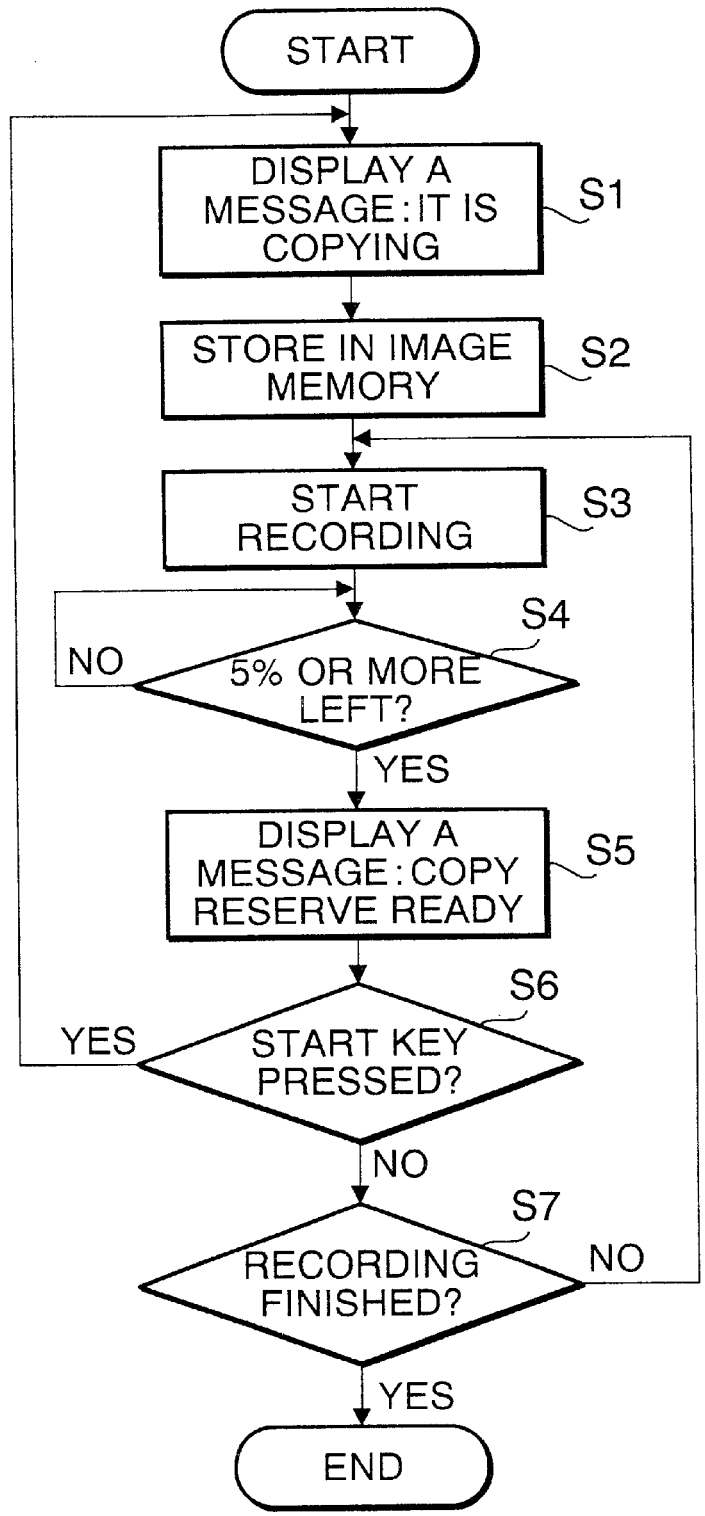
FIG. 2 is a flow chart to show the operation of the copy-facsimile machine shown in FIG. 1 in a copy mode.

When a document is placed on the scanning unit 14, the number of copies and the scaling (magnification) are set through the numerical key pad 16a, and the start key 16a is pressed by an operator, then a message indicating the machine is copying is shown on the display 17 at step S1 of the FIG. 2.

At step S2, the document is scanned by the scanning unit 14, and the resulting image data is encoded in a format such as MMR by the CODEC 19 to be stored temporarily in the image memory 18.

At step S3, the image data stored in the image memory 18 is read-out and decoded by the CODEC 19, and the recording on recording sheets is started in the recording unit 15. At step S4, whether the memory has more than 5% left of the capacity in the image memory 18 is determined. The reason why the left memory should be at least 5% is that a typical amount of data for the A3 size, which is the maximum size for scanning, requires that amount of memory. When the left memory is 5% or more in the image memory 18, the procedure will go on to the step S5. On the other hand, when the left memory is less than 5%, the machine should wait until the memory is restored to have 5% or more left.

At step S5, a message indicating that copy reserve is ready is displayed on the display 17.

At step S6, if the user puts a next document on the scanning unit 14, sets the necessary number of copied sheets and the scaling, and presses the start key 16d, the process goes back to step S1. Then, scanning and image data storage in the image memory 18 is executed; in other words, this is the way copy is reserved.

At step S7, it is judged whether all the recording (including the reserved copy) is finished or not. When all the recording is finished, the process will be finished. When all the recording is not finished, the procedure will go back to step S3 and execute the recording of image data in the recording unit 15.

Following is the description of the function and effects of the embodiment described above.

(1) Even while the machine is under the process of copying, the display 17 shows that copy reserve is ready. As a result, it is possible to put other documents on the scanning unit 14, set the number of necessary copied sheets and the scaling and the like using the numerical key pad 16a, and press the start key 16d even during the copying operation. Then, the document is scanned in the scanning unit 14, and the image data is stored in the image memory 18. In other words, even during the copying operation, copy reservation is available. It is not necessary to wait for the present copying operation to come to an end. In addition, it is possible to increase the utility rate for the copying function of the copy-facsimile machine 1.

(2) Copy reservation can be made only when there is 5% or more memory left, so that there is no overflow of the image memory 18, eliminating aborted copy reserve. In other words, an operator will not perform the copy reservation operation when the machine is not ready for copy reservation.

The embodiment described above may be modified as illustrated in FIG. 3A. When a plurality of copy reservations are made, the display 17 may indicate the settings (the number of sheets of a scanned document, the number of necessary copies, the size of the recording sheet, and the scaling) in the order of the reservations.

Another modification is illustrated in FIG. 3B. The display 17 may be designed to also display the expected time of completion based on the items set in the copy reserve. In this way, extra work can be done while waiting for the copy to be finished until the expected time.

The display unit 17 may display that the scanned image data size is larger than the left memory capacity of the image memory 18 if such a case occurs. Further, the stored image data for the reserved copying may be deleted from the image memory 18.

If the copy-facsimile machine 1 has an energy saving key (or function) to reduce electricity consumption during the waiting time, the display unit 17 may display that copy reserve is ready during the waiting time before the completion of restoration processes from the energy saving mode to an ordinary mode, and at the same time the scanning unit 14 may scan the document for the image memory 18 to store the scanned image.

Furthermore, during the warm-up period after the power is turned on, the display unit 17 may display that the copy reserve is ready and at the same time the scanner 14 may read in the image and store it in the image memory 18.

The above-described embodiments can be applied to a copy machine.

What is claimed is:

1. An image forming device comprising:
a scanning unit to scan a first image;
an image memory to store the scanned first image;
a recording unit to record the stored first image; and
a control unit that causes the scanning unit to scan another image of which copy is to be made, and causes the image memory to store the scanned another image, while the recording unit is recording the stored first image;
wherein copy conditions of the another image are determined and the another image is scanned while the recording unit is recording the stored first image;
further including a display unit to display that the scanning of the another image is ready while the recording unit is recording the stored first image;
wherein the display unit displays contents of setting for copy of the another image;
wherein the display unit displays waiting time until the completion of recording of the first image;
wherein the contents of setting for copy include the number of copies to be made, and the size of the recording sheet; and
wherein the control unit does not cause the scanning unit to scan the another image if a remaining capacity of the image memory is less than a predetermined volume.

2. The image forming device as in claim 1, wherein the display unit displays that the scanning of the another image is not possible if the remaining capacity of the image memory is less than a predetermined volume.

3. The image forming device as in claim 2, wherein the display unit displays how many pages worth of image is scanned by the scanning unit.

4. A method comprising the steps of:
A) scanning a first image;
B) storing the first image in a memory;
C) printing the first image while scanning another image and storing the another image in the memory;
wherein copy conditions of the another image are determined and the another image is scanned while the first image is being printed;
D) displaying that the scanning of the another image is ready while the first image is being printed;
E) displaying contents of setting for copy of the another image; and
F) displaying waiting time until the completion of printing of the first image;
wherein the contents of setting for copy include the number of copies to be made, and the size of the recording sheet, and
the another image is not scanned if a remaining capacity of the memory is less than a predetermined volume.

5. The method as in claim 4 further including the step of G) displaying that the scanning of the another image is not possible if the remaining capacity of the image memory is less than the predetermined volume.

6. The method as in claim 5 further including the step of H) displaying how many pages worth of image is scanned.

* * * * *